United States Patent [19]

Alenskis et al.

[11] Patent Number: 4,867,834
[45] Date of Patent: Sep. 19, 1989

[54] FILAMENT WINDING SYSTEM

[75] Inventors: Brian A. Alenskis, Bountiful, Utah; Gerald L. Geil, Diamond Bar, Calif.; Dee R. Gill, Sandy; Brian N. Moloney, West Valley City, both of Utah

[73] Assignee: Hercules, Wilmington, Del.

[21] Appl. No.: 163,141

[22] Filed: Feb. 24, 1988

Related U.S. Application Data

[63] Continuation of Ser. No. 849,065, Apr. 7, 1986, abandoned.

[51] Int. Cl.$^4$ ............................................. B65H 81/00
[52] U.S. Cl. ..................................... 156/433; 156/353; 156/425; 156/517; 156/523
[58] Field of Search ............... 156/169, 173, 175, 181, 156/189, 425, 433, 507, 428–432, 512, 517, 264, 266, 353, 523, 574, 504

[56] References Cited

U.S. PATENT DOCUMENTS

| | | | |
|---|---|---|---|
| 3,025,205 | 3/1962 | Young | 156/169 |
| 3,146,962 | 9/1964 | Hardwick | 242/2 |
| 3,424,395 | 1/1969 | Schmidt | 242/67.1 |
| 3,711,350 | 1/1973 | Witzel, III | 156/169 |
| 3,737,352 | 6/1973 | Avis et al. | 156/181 |
| 4,010,054 | 3/1977 | Bradt | 156/173 |
| 4,056,238 | 11/1977 | Ciniglio et al. | 242/25 R |
| 4,068,536 | 1/1978 | Stackhouse | 74/417 |
| 4,078,957 | 3/1978 | Bradt | 156/173 |
| 4,172,755 | 10/1979 | Gustafson et al. | 156/504 |
| 4,288,267 | 9/1981 | McLarty | 156/175 |
| 4,292,108 | 9/1981 | Weiss et al. | 156/523 X |
| 4,323,408 | 4/1982 | Dana et al. | 156/175 |
| 4,392,341 | 7/1983 | Grill | 57/90 |
| 4,437,616 | 3/1984 | Magarian | 242/7.02 |

FOREIGN PATENT DOCUMENTS

84/00351 2/1984 World Int. Prop. O. .......... 156/181

Primary Examiner—Michael W. Ball
Assistant Examiner—Geoffrey L. Knable
Attorney, Agent, or Firm—Connolly & Hutz

[57] ABSTRACT

A filament winding system includes a head that selects the number of tows within a winding band while winding and positions the winding band directly on the mandrel according to its contours.

9 Claims, 5 Drawing Sheets

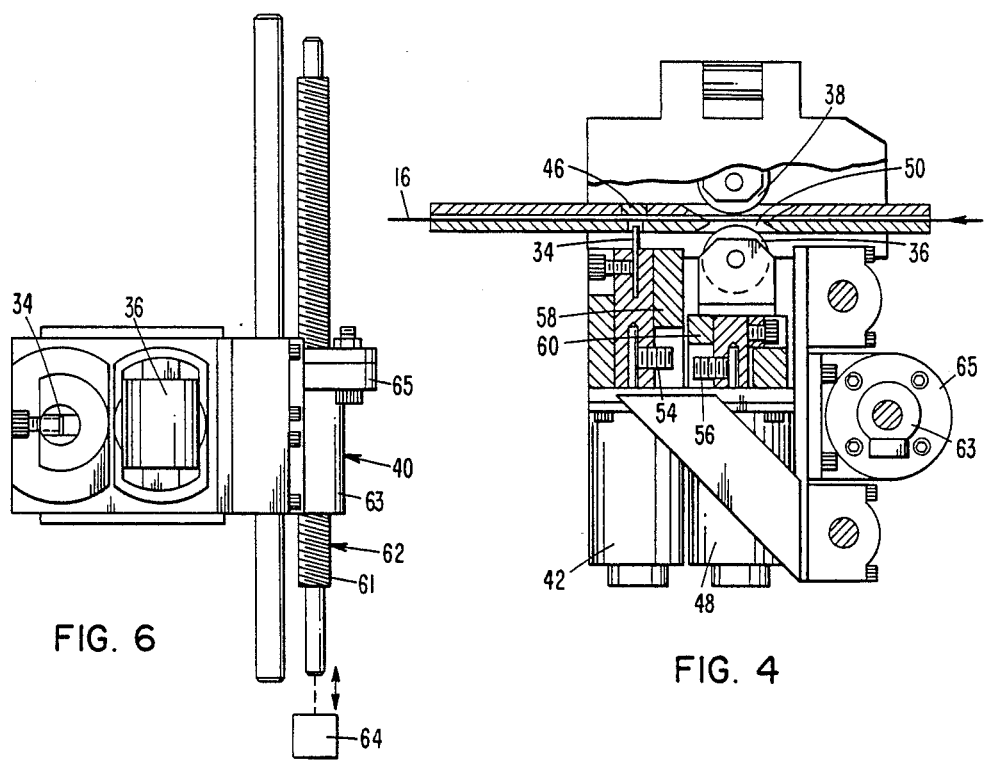
FIG. 6
FIG. 4
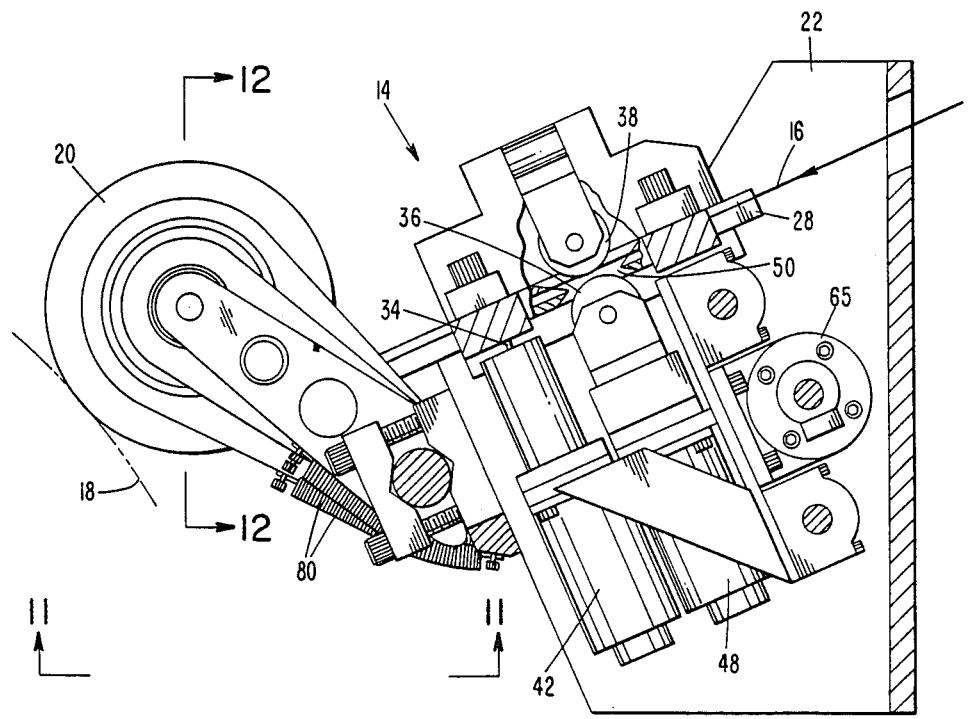
FIG. 3

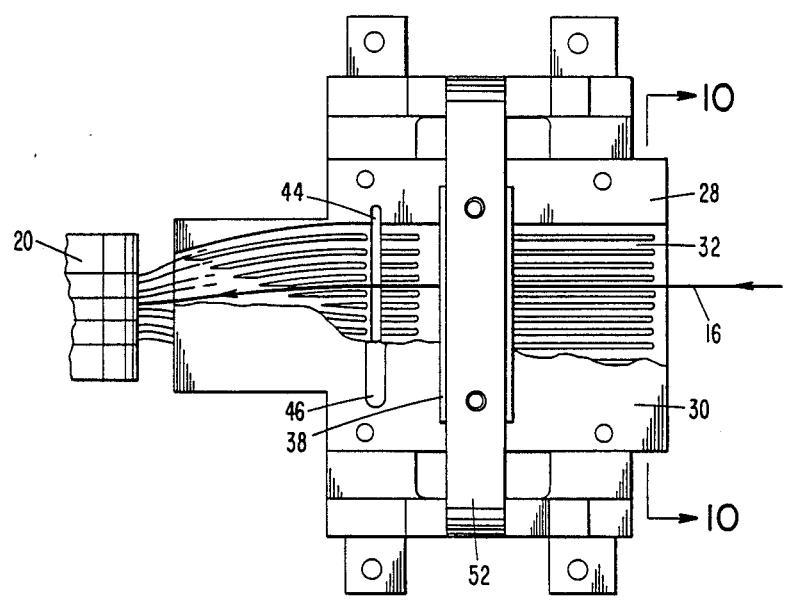
FIG. 7
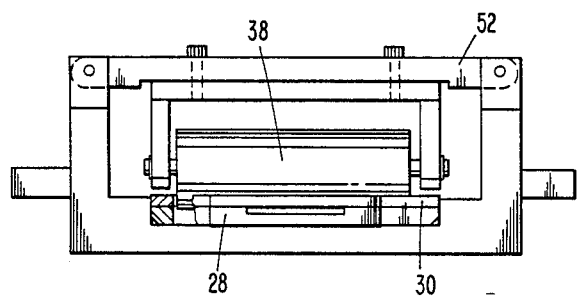
FIG. 8
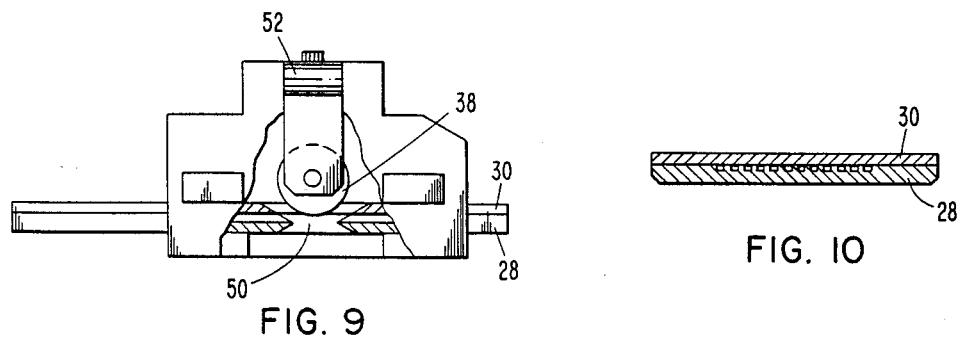
FIG. 9
FIG. 10

FILAMENT WINDING SYSTEM

CROSS-REFERENCE TO RELATED APPLICATION

This application is a continuation of Ser. No. 849,065, filed Apr. 7, 1986, now abandoned.

BACKGROUND OF THE INVENTION

Present filament winding systems generally consist of winding fibrous rovings or tows impregnated with a thermosetting resin in a helical pattern in a number of superimposed layers onto a mandrel to produce a tubular article. In most types of filament winding operations, the rovings pass through a delivery eye or from a delivery roller across an air space onto the part. In this type of system, tows cannot be added or deleted during operation to adjust to the varying contours of the part being wound. Furthermore, this type of system does not permit precise location of tows onto the part. Conventional tape laying systems generally provide positioning of the rovings on flat or slightly contoured surfaces, however, these systems cannot wind continuously nor control band width.

The inability to alter bandwidth while winding parts with non-uniform cross-section, such as fusalages, tapered wing skins, domes or missile nose cones, results in overlapping or gapping of the winding band. The imprecise location of fiber tows on the part being wound causes a non-uniform winding pattern, which creates non-uniform structural properties in the finished article. The completed wound article may be deemed unsuitable for its expected use, resulting in the eventual scrapping of the entire article.

SUMMARY OF THE INVENTION

A filament winding head includes a tray over which the tows of filaments pass for application to the mandrel. A pair of elongated slots extend through the tray across the path of travel of the tows. A knife is positioned at one slot for cutting at least one tow at times when it is desired to limit the application of tows to the mandrel. A pair of rollers are positioned at the other slot with each roller being on a different side of the tray for engaging the cut tow and resuming its feed to the mandrel.

THE DRAWINGS

FIG. 3 is a cross-sectional view in elevation of the filament winding head of FIG. 2;

FIG. 4 is an elevational view partly in section of the cut and add assembly of the filament winding head of FIGS. 2-3;

FIG. 6 is a top plan view of a portion of the filament winding head of FIG. 2;

FIG. 7 is a top plan view of a tray used in the filament; winding head of FIG. 2;

FIG. 8 is a front elevation view of the tray of FIG. 7;

FIG. 9 is a side elvation view partly in section of the tray of FIG. 7;

Figure 11:
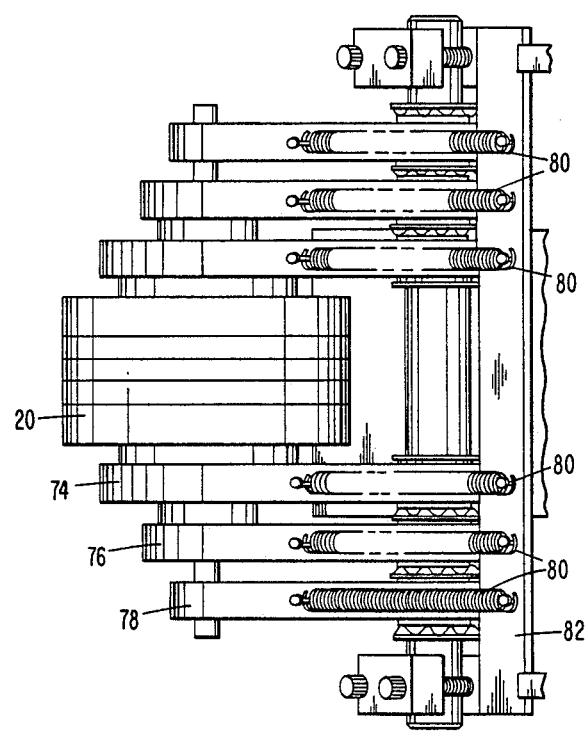
Figure 12:
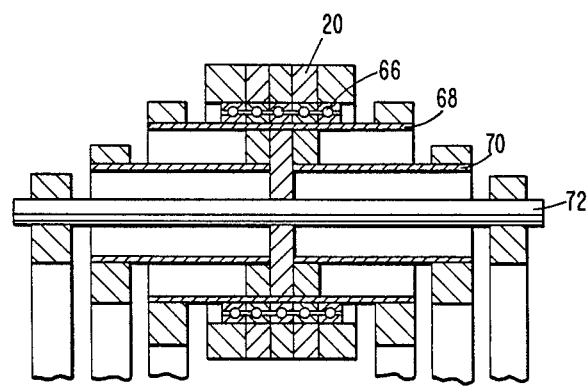

FIG. 10 is a cross-sectional view taken through FIG. 7 along the line 10—10; and FIGS. 11-12 are cross-sectional views taken through FIG. 3 along the lines 11—11 and 12—12, respectively.

DETAILED DESCRIPTION

Figure 1:
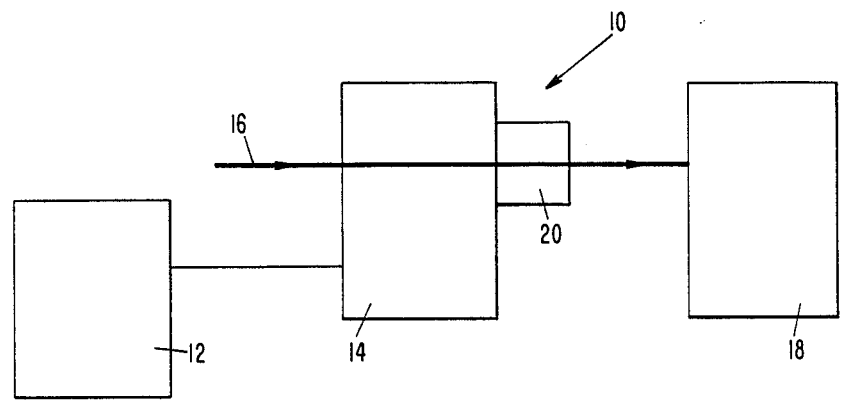
FIG. 1 is a schematic view of an assembly incorporating the filament winding head of this invention.

The present invention is directed to a system for precisely applying filaments in the form of rovings, tows or the like to irregularly shaped mandrels. FIG. 1 illustrates such an assembly 10 is accordance with the broad aspects of this invention. As shown therein, a manipulator 12 is secured to and positions filament winding head 14 so that the tows 16 may be applied to mandrel 18 from delivery rollers 20 of head 14. Although FIG. 1 illustrates for clarity rollers 20 to be spaced from mandrel 18, in practice rollers 20 ride against rotating mandrel 18. Manipulator 12 may be of any suitable construction so as to maintain the delivery end of head 14 properly positioned with respect to the irregularly shaped rotating mandrel for making, for example, a fuselage. One known form of manipulator is described in "Three Roll Wrist Robot" by Moshe Frank, a technical paper of 1980 Robotics International of SME of Dearborn, Mich. (MS80-699). Such manipulator or wrist is suitable for its three roll versatility and is known in the art as a roll, roll, roll wrist. The invention may be practiced with a remotely operable manipulator orienting an end-effector mounted to one end of a plurality of serially connected drive shafts. The manipulator has two sets of concentric shafts with individual shafts within each set independently rotatable about an axis common to the set. The common axes of the two sets are obliquely oriented with respect to each other; and a third shaft rotatable about a third axis, is angularly oriented and connected to the most remote set of shafts. The manipulator preferably has the axes of the two sets and the third shaft intersecting at a single point and permits orientation of the third axis normal to any point upon the spherical surface of a spherical sector generated by the combined movement of the plurality of shafts. Such a manipulator may be of the type disclosed in U.S. Pat. No. 4,068,536, the details of which are incorporated herein by reference thereto.

Although three axes manipulators are known, the broad practice of this invention includes the utilization of such manipulators to control the delivery of tows or the like so that the tows may be applied in an accurate and controlled manner to an irregular surface. Such use of manipulators is new.

A total six axis variation would be obtained by including, in addition to the three axis roll, roll, roll wrist, movement around the longitudinal axis of the carriage for head 14 and in and out movement of the whole device as well as mandrel rotation.

In the preferred embodiment of this invention which is illustrated and described herein, a novel filament winding head is used for the actual application of the tows. The filament winding head 14 illustrated in FIGS. 2-12 is characterized by a cut and add or splice assembly which permits a variation in the application of the tows to the mandrel to compensate for the variation in curvature of the mandrel so as to control the amount of thickness of the tows being applied to the mandrel. At certain locations on the mandrel, for example, it may be desired to deliver a lesser amount of tows which is accomplished by the cut and add assembly cutting a single or any desired number of tows to thereby prevent those tows from being applied to the mandrel. For other curvatures of the mandrel it may again be desired to deliver those tows once again to the mandrel and the cut and add assembly permits the cut tows to again be delivered.

Figure 2:
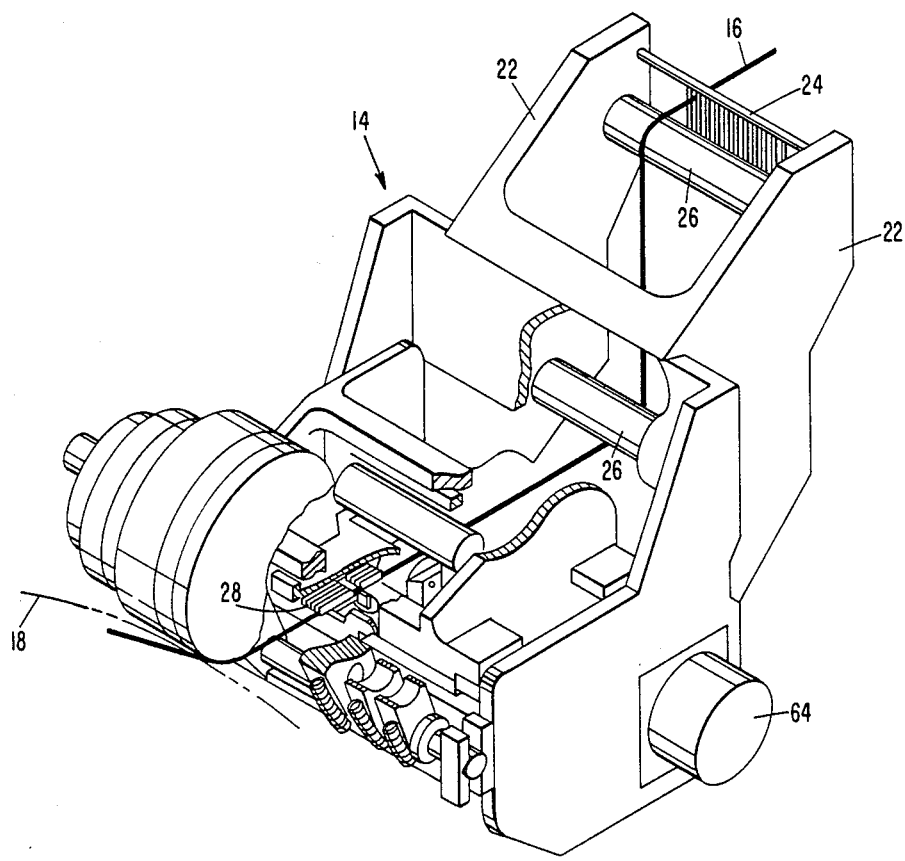
FIG. 2 is a perspective view of the filament winding head of FIG. 1.

FIG. 2 illustrates the general operation of filament winding head 14. For the sake of clarity and understanding, only one tow 16 is illustrated. In actual operation, however, a large number of, such as 30, tows would be delivered through winding head 14. Various sections of winding head 14 would be temperature controlled to either heat or cool the filaments as required for the operation. FIG. 2 illustrates winding head 14 to include a pair of plates 22 to which is mounted a comb 24 for properly spacing the plurality of tows 16. Tows 16 then pass around an S bar 26 in the hot zone of head 14. In this hot zone, ribbonized tows are heated by resistance heaters in S bar 26. The ribbonized tows then pass through a second comb (not shown) and across a tray 28 (FIG. 7). As shown in FIG. 10, tray 28 includes cover 30 made of any suitable material so that the tows are protected during their delivery while being conveyed through troughs or channels 32 provided on the upper surface of tray 28. As shown in FIG. 7, the roughs 32 converge at the delivery end of tray 28.

As shown in FIGS. 2-3, the head 14 holds a set of application rollers 20 which are positioned by the winding machine such that they can roll upon the mandrel surface. The rollers 20 are individually forced against the surface 18 so as to conform to the present tooling shape as it changes. A band of fibers, or rovings, or tows 16 can be directed between the mandrel 18 and the application rollers 20, thus being positioned onto the part. The design provides for many such rollers, allowing the roving 16 at different positions within the band to travel at the different speeds which mandrel contours might dictate.

As later described, an important feature is the capability to index a blade or knife 34 within the delivery head to cut a roving from the moving band. Cut rovings are pulled through the application rollers, with the cut supply end remaining near the knife.

When the fiber is needed back in the band, the head 14 indexes a splice roller 36 which pinches against an idler roller 38 and both the stationary, cut roving and a number of moving rovings. Through this idler roller 38, the moving rovings drive the cut roving between the application rollers 20 and the mandrel 18 and back onto the part being wound. The splice roller 36 and idler roller 38 are then disengaged and the system readied for another cut or splice.

A preferred configuration includes a tray 28 having individual roughs 32 for each roving path and two rovings sharing each application roller 20. The knife and splice roller travel together on a carriage 40 indexed by a microprocessor-controlled stepping motor 64. The knife 34 is solenoid-actuated and cuts with a chopping technique. The splice roller 36 is actuated by a separate solenoid against the idler roller 38 positioned just beyond the opposite side of the fiber path. The rollers 20 which place the fiber upon the mandrel 18 are of the same diameter and are spring-loaded about a common axis.

The concept of this invention allows in-process variation of the fiber within the winding band. This permits density variations as well as compensations for effects inherent in mandrel contours or winding patterns.

The approach permits winding non-geodesic patterns by the rolling of fiber directly onto the mandrel at minimal tension. The individual application rollers adjust to the contour and fiber speed differences. Accurate positioning of the delivery head is required for complex winds.

Figure 5:
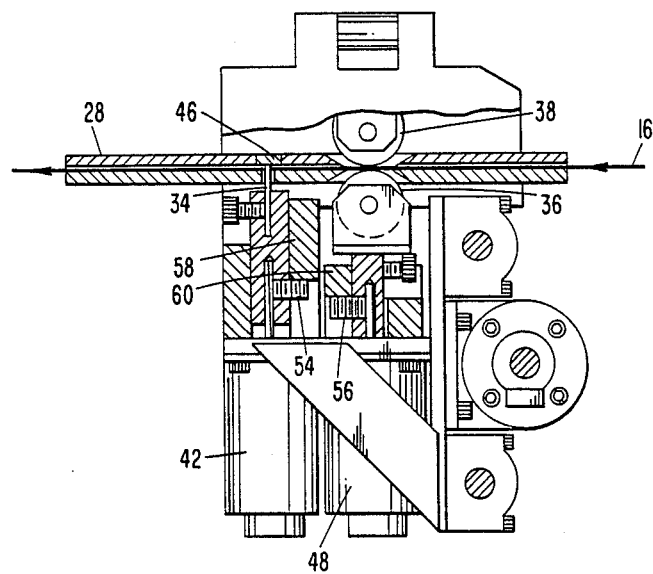
FIG. 5 is a view similar to FIG. 4 in a different phase of operation.

FIGS. 4 and 5 best illustrate the operation of knife 34 and splice or add roller 36. As shown therein, knife is associated with solenoid 42 and is positioned for movement in elongated slot 44 (see also FIG. 7) which extends across and below the path of travel of the series of rovings or tows 16. Cover 30 includes an anvil section 46 such as an aluminum insert disposed above slot 44. When it is desired to cut a tow or roving 16, solenoid 42 is actuated to cause knife 34 to move upwardly until it contacts anvil 46 thereby cutting the tow 16 passing below anvil 46. When it is later desired to add the cut tow for delivery to mandrel 18, a second solenoid 48 is actuated to move splice roller 36 upwardly into slot 50 and into contact with idler roller 38 positioned above slot 50. Slot 50 also extends the length of the path of movement of the plurality of tows in tray 28. Slot 50 would be of comparable length to slot 44. FIG. 7 illustrates a support bar 52 which is mounted directly above slot 50 and to which is secured idler roller 38.

In the illustrated embodiment, knife 34 is dimensioned to correspond to the width of a single tow 16 (see FIG. 6). Splice roller 36, however, is dimensioned to correspond to a plurality of tows 16, while idler roller 38 is dimensioned to extend the length of slot 50, so that upon actuation of solenoid 48, roller 36 presses against the cut tow 16 as well as uncut tows which are pinched between rollers 36 and 38. As a result, the uncut tows cause idler roller 38 to rotate and thus drive the cut tow in a forward direction so that it may again be delivered to mandrel 18. FIG. 4 illustrates the condition of both the knife 34 and splice roller 36 when inactive. FIG. 5 illustrates the position of knife 34 and roller 36 when actuated by their solenoids 42, 48. It is to be understood that the solenoids would be separately actuated so that in practice both knife 34 and roller 36 would not be in their elevated positions at the same time.

As shown in FIGS. 4 and 5, set screws 54, 56 are used for replaceably mounting the knife assembly and roller assembly to the respective solenoids. The set screws additionally function as stop members to limit the upward movement of the knife 34 and roller 36 when set screw 54 contacts bar 58 and when set screw 56 contacts bar 60. The contacting position is shown in FIG. 5.

As previously discussed, knife 34 and roller 36 are mounted on a carriage 40 which is associated with a ball screw 62 driven by stepper motor 64. Ball screw 62 is computer controlled for moving carriage 40 transversely under tray 28 for precisely positioning knife 34 and roller 36 in the proper location for accurately controlling which tow will be cut and later spliced.

Ball screw 62 consists of a male threaded shaft 61 and threaded sleeve 63, connected by fasteners to L bracket 65. One end of shaft 61 connects to a bearing block mounting on the outside of the head housing. The other end of shaft 61 connects to the center axle of microprocessor controlled stepper motor 64 by means of a bellows coupling. Stepper motor 64 is driven by programmed numerical control units (not shown) in a manner well known to those skilled in the art so that stepper motor 64 rotates in either a clockwise or counterclockwise direction. Movement of stepper motor 64 rotates shaft 61, forcing sleeve 63 to move in an axial direction. Axial movement of sleeve 63, to which L bracket 65 of the cut and splice assembly attaches, moves the entire cut and splice assembly transversely along support shafts within the housing. Control of the cut and add assembly is achieved by feeding the mandrel profile information to the microprocessor.

Application rollers 20 are separate steel rings of equal diameter. Rollers 20 rotate freely on bearings 66. As shown in FIG. 12, the three innermost rings have the same width as the bearing rings. The two outer rings are wider than the bearing rings to provide added protection against rovings 16 sliding off application rollers 20 during operation. An adhesive bonds bearings 66 to inner surface of application rollers 20.

Application rollers 20 rotate about separate steel shafts. The inner surface of bearing rings 66 bonds to these shafts adhesively. Ring 68 rotates on steel ring 70 connected to solid steel shaft 72. The innermost shaft 72 attaches to steel arms 78 at both ends. Shafts 68, 70 are hollow steel tubes of greater inner diameter than the outer diameter of the innermost shaft 72. Shafts 68, 70 are each adhesively bonded on one end to steel arms 74, 76.

Application rollers 20 roll along mandrel surface 18. Spring loaded steel arms 74, 76, 78 force application rollers 20 against mandrel 18. Extension springs 80 extend from steel bar 82 transversing the housing of head 14. Springs 80 provide constant tension on steel arms 74, 76, 78 thus keeping application rollers 20 in contact with mandrel 18 during operation.

Application rollers 20 deliver up to two rovings 16 each. Application rollers 20 precisely position rovings 16 on mandrel 18. The precise location of rovings 16 results in a uniform winding pattern over substantially the entire length of mandrel 18 and causes more constant structural properties for the article produced.

In the preferred embodiment of this invention, the individual tows or rovings 16 remain spaced from each other until the tows contact the mandrel 18. Upon contacting mandrel 18, the tows 16 combine under the pressure of mandrel 18 which causes the tows to spread into contact with each other.

At the start of machine operation, the ends of the fibrous rovings 16 are grouped together and manually pass through filament winding head 14. Rovings 16 passing through head 14 are parallel, forming a flat winding band similar to a tape or ribbon. The winding band connects to mandrel 18 by any suitable means. Mandrel 18 may be rotated manually initially to draw rovings 16 from spools of rovings (not shown) behind filament winding head 12 through filament winding head 12 and onto mandrel 18.

Fibrous rovings 16 can take the form of mineral fibers, such as glass, or graphite; vegetable fibers, such as cotton or wool, synthetic fibers, such as nylon, polyester, or the like; or metal fibers such as steel. Rovings 16 may be coated with an uncured thermosetting resin, such as polyester or epoxy resin by passing rovings 16 through resin baths (not shown) prior to winding rovings 16 onto mandrel 18. Where dry, non-resin coated rovings 16 are used, mandrel surface 18 may be coated with a film adhesive to prevent spillage of the initial layer of fibers.

Any suitable filament arrangement may be used in the practice of this invention. Preferably resin is applied to the filaments before the tows reach head 14. Head 14 includes various hot and cold zones to maximize the effectiveness of operation. For example, in the vicinity of knife 34 and roller 36, the tows are cooled so that the tows would have sufficient stiffness to facilitate cutting and will maintain their integrity and will not droop to facilitate adding the cut tows.

The fiber guide tray 28, cutting blade or knife 34, splice and idler rollers 36, 38 and application rollers 20 are cooled by a flow of refrigerated air to between 40° F. and 60° F. to prevent transfer of resin from the fiber to contacting parts. Heated air from electric heat guns is used to provide tack to the fiber as it contacts the part.

Adjustment of the cutting blade and splice roller force is afforded by adjusting the length the solenoid push rods, thus altering the solenoid plunger position at the extreme travel of the blade or roller. Higher forces are obtained when the solenoid plunger is at or near the end of its stroke.

Numerous variations of the invention are possible within the concepts described herein. For example, the illustrated embodiment is specifically directed to the use of individual delivery rollers and to the use of a transversely movable cut and add assembly for cutting and adding single tows. The invention, however, may also be practiced by using a solid roller or a skid plate in place of rollers 20 and by using a fixed knife and fixed splice roller of appropriate dimension to simultaneously cut and later add a plurality of tows including the cutting and adding of all of the tows. In such a variation, the knife and add roller would be of a length corresponding to the entire length of slots 44 and 50. Accordingly, the only computer control necessary would be to control when the cut and add operations take place but would not be required for moving the cut and add assembly in a transverse direction as by a ball screw. Such a variation could be used where it might be desired to completely omit the supply of tows to certain portions of a mandrel.

Similarly, the fixed knife and splice roller assembly or a plurality of such assemblies could be dimensioned for cutting groups of tows and sets of such fixed assemblies could be positioned along different portions of tray 28 with appropriate slots provided. The invention may also be practiced by combining the fixed cut and add assembly with a movable cut and add assembly where, for example, the movable assembly is upstream from the fixed assembly.

The invention can be used with mandrels of differing diameters and shapes. While the delivery head system has particular application to filament winding systems using a 360° delivery of fibrous rovings onto the mandrel, it is contemplated that other winding systems may also be employed. It is further contemplated that the invention may be used with a mandrel that rotates about its longitudinal axis and also translates axially.

The invention lends itself to complete automation, thereby increasing production while minimizing labor costs. Numerical control systems can be programmed such that rovings may be wound onto mandrel 18 at any desired angle, which can vary during the winding operation. The amount of fiber required to produce a given article may be determined prior to starting the winding operation, allowing the wound article to be manufactured without an attendant. A distinct advantage of the invention is the ability to provide zero degree fiber orientation, or fiber placement with the mandrel axis. The 6-axis machine of this invention with its cut and splice capability permits a dramatic reduction of scrap material by eliminating the need for fiber wrap-arounds over the mandrel ends. Tapered parts, such as wing skins, can be fabricated with a constant skin thickness by automatically varying the number of fiber tows during winding. Moreover, angle changes during winding are possible with no fiber distortion while eliminating band wrinkling. With the invention complex contours there can be filament wound as a single piece.

What is claimed is:

1. In a filament winding system for winding rovings, tows, tapes or the like on an irregularly contoured mandrel including a supply unit for feeding a plurality of spaced rovings across a tray and against a delivery device for placement on a rotating mandrel, the improvement being a cut and add assembly for selectively cutting tows for reducing the number of tows applied to the mandrel and for selectively resuming the feed of the cut tows in accordance with the contour of the mandrel, a pair of slots extending across said tray of a length corresponding to the path of movement of the tows, said cut and add assembly comprising a cutting device associated with one of said slots and a clamping device associated with the other of said slots, said cutting device comprising an anvil positioned on one side of said tray in line with said one slot and a knife positioned on the other side of said tray in line with said anvil and vertically movable into said one slot for contacting said anvil, said clamping device comprising an idler roller positioned on one side of said tray in line with said other of said slots, said idler roller being positioned for being contacted and driven by said uncut tows, a splice roller being positioned on the other side of said tray in line with said idler roller, and said splice roller being vertically movable into contact with said idler roller.

2. The system of claim 1 including means for selectively moving said knife and said splice roller across and beneath said tray for selective positioning with respect to the tows.

3. The system of claim 2 wherein said means for selectively moving comprises a ball screw, a carriage mounted to said ball screw, and said knife and said splice roller being mounted to said carriage.

4. The system of claim 1 wherein said assembly includes solenoids for selectively vertically moving said knife and said splice roller.

5. The system of claim 4 including a plurality of troughs in the upper surface of said tray whereby each tow may be guided in a respective trough.

6. The system of claim 5 wherein said delivery device includes a plurality of delivery rollers mounted at the downstream end of said tray in line with said troughs for contacting the mandrel and positioning the tows on the mandrel.

7. The system of claim 1 including a manipulator having three axes rotation and connected to said assembly for controlling the position of said delivery rollers to maintain said delivery rollers in contact with the mandrel.

8. The system of claim 1 wherein said anvil is positioned above said tray, said idler roller being positioned above said tray, and said splice roller being positioned below said tray.

9. The system of claim 1 wherein said idler roller extends completely across the path of the rovings.

* * * * *